United States Patent
Homma

[11] Patent Number: 6,003,207
[45] Date of Patent: Dec. 21, 1999

[54] CLIP STRUCTURE OF PORTABLE COMMUNICATION TERMINAL

[75] Inventor: Yasuyuki Homma, Shizuoka, Japan

[73] Assignee: NEC Corporation, Tokyo, Japan

[21] Appl. No.: 09/241,014

[22] Filed: Feb. 1, 1999

[30] Foreign Application Priority Data

Feb. 16, 1998 [JP] Japan .................................. 10-033211

[51] Int. Cl.⁶ .............................. A44B 21/00; A45F 5/00; G01D 11/00
[52] U.S. Cl. .............................. 24/3.12; 24/3.11; 24/3.12
[58] Field of Search .............................. 24/3.1, 3.11, 3.12

[56] References Cited

U.S. PATENT DOCUMENTS

| | | | |
|---|---|---|---|
| 1,403,707 | 1/1922 | Quarnstrom | 24/3.1 |
| 2,400,626 | 5/1946 | Brede | 24/3.1 |
| 2,513,851 | 7/1950 | Dodds | 24/3.1 |
| 4,277,863 | 7/1981 | Faneuf | 24/3.12 |
| 5,235,728 | 8/1993 | Nordberg . | |
| 5,730,348 | 3/1998 | Tien | 24/3.12 |
| 5,791,019 | 8/1998 | Jeong | 24/3.11 |

FOREIGN PATENT DOCUMENTS

| | | | |
|---|---|---|---|
| 8219405 | 12/1983 | Japan | 24/3.11 |
| 4-2549 | 1/1992 | Japan . | |
| 4187102 | 7/1992 | Japan | 24/3.1 |
| 3024490 | 2/1996 | Japan . | |
| 08121423 | 5/1996 | Japan . | |
| 3014670 | 8/1993 | WIPO | 24/3.1 |
| WO 94/11909 | 5/1994 | WIPO . | |

*Primary Examiner*—Victor N. Sakran
*Attorney, Agent, or Firm*—Scully, Scott Murphy & Presser

[57] ABSTRACT

A clip is fixed on the front or rear case, so as to obtain elastic force between clip and the surface of the case in order to suspend the body of a portable communication terminal on the clothes or bags. The clip is a molded synthetic resin which is itself elastic. Further, there is formed, on the front or rear case, a pocket which puts in a base portion of the clip from the side direction of the case. Further, a window portion is formed for guiding an elastic supporting portion of the clip from the pocket to the outer surface of the case. Furthermore, there is formed, on a base portion of the clip, a screw fixing portion which is inserted into the pocket and is fixed to one of the cases at the position of a screw insertion portion of the other case by using a screw.

8 Claims, 2 Drawing Sheets

CLIP STRUCTURE OF PORTABLE COMMUNICATION TERMINAL

BACKGROUND ON THE INVENTION

1. Technical Field of the Invention

The present invention relates mainly to a structure for a clip of a portable remote terminal such as a pocket telephone.

2. Description of the Prior Art

In general, portable remote terminals are suspended on a belt of trousers, a pocket of a jacket, or a bag. As shown in FIGS. 5 and 6, the base of clip 15 is fixed through hinge axis 14 to hinge holders 13 which are provided on either of front case 11 or rear case 12 (mostly on rear case 12) which is a part of a frame of the portable remote terminal. In this case, an elastic body 16 such as a leaf spring is used for rendering restoring force for clip 15.

The conventional structure, as shown in FIGS. 5 and 6, assembled by using a plurality of parts such as a leaf spring is not easy to manufacture and raises product cost. Therefore, an elastic synthetic resin, or a molded body including a wire harness has been used for the clip, as disclosed in, for example, JP(Y2)-Hei 4-2549, 1992. However, the structure of a clip made of an elastic resin or molded body becomes complex and difficult to assemble, because it is laborious to fix the clip to the case.

SUMMARY OF THE INVENTION

Therefore, an object of the present invention is to provide a simple and strong clip structure of a portable remote terminal, utilizing the elastic force of the clip itself. In the present invention, the clip is mounted by utilizing a screw for fixing the front case to the rear case.

According to the present invention, there is provided a clip structure for a portable remote terminal such as a pocket telephone, wherein a front case is connected with a rear case by using a screw which also fixes a clip on either of the front case or the rear case. The clip is fixed on the front or rear case, so as to obtain the elastic force between the clip and the surface of the case in order to suspend a body of the portable remote terminal on the clothes or bags. In the clip structure of the present invention, the clip is a molded synthetic resin which is itself elastic. Further, there is formed, on the front or rear case, a pocket which puts in a base portion of the clip from the side direction of the case. Further, a window portion is formed for guiding an elastic supporting portion of the clip from the pocket to the outer surface of the case. Furthermore, there is formed, on a base portion of the clip, a screw fixing portion which is inserted into the pocket and is fixed to one of the cases at the position of a screw insertion portion of the other case by using a screw.

Further, the screw insertion portion is formed on a pier which is formed outside the opening portion of the pocket of one of the cases and at the same time inside the rear case. Then, the screw insertion portion is overlapped with other screw insertion portion which is formed in other screw fixing portion of the clip, in order to insert a screw into a screw tap of the front case. Further, the pier and the screw fixing portion are covered by a cover, and the cover and the rear case are connected with the front case.

The base portion of the clip is inserted tightly into a groove of the pocket. Here, the screw fixing portion and the base portion are preferably made by molding to form a united body of the clip.

Therefore, according to the present invention, a number of parts and assembling steps are reduced, in comparison with the conventional structure which includes hinge axis or spring. Particularly, the assembling step for fixing a clip is simplified, because only one screw tightens up the front case, the clip and the rear case, at the same time.

PREFERRED EMBODIMENT OF THE INENTION

Figure 1:
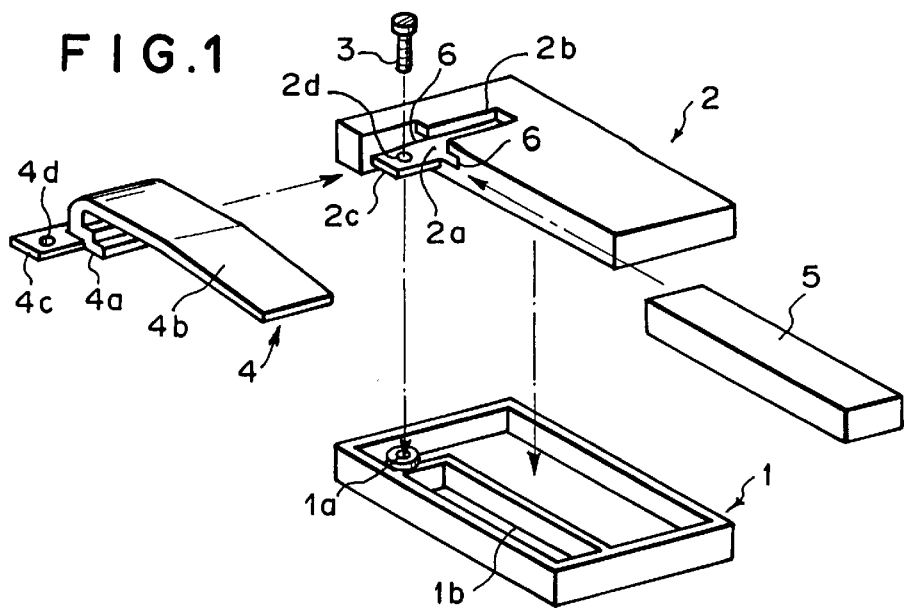
FIG. 1 is a exploded perspective view of a portable remote terminal which includes a clip structure of the present invention.

Referring to FIGS. 1 to 4, a mode of embodiment of the present invention is explained. Front case 1 is connected with rear case 2 by using screw 3. Clip 4 is fixed on either of front case 1 or rear case 2. In the embodiment as shown in FIGS. 1 to 4, Clip 4 is fixed on rear case 2, so as to obtain the elastic force between clip 4 and a surface 7 of rear case 2 in order to suspend a body of the portable remote terminal on the clothes or bags.

In the clip structure of portable remote terminals, clip 4 is a molded synthetic resin which is elastic. Further, there is formed on rear case 2 pocket 2a which puts in base portion 4a of clip 4 from the side direction of rear case 2. Further, window portion 2b is formed for guiding elastic supporting portion 4b of clip 4 from pocket 2a toward the outer surface of rear case 2. Furthermore, there is formed, on base portion 4a of clip 4, screw fixing portion 4c which is inserted into pocket 2a and is fixed to front case 1 at the position of screw insertion portion 2c of rear case 2 by using screw 3.

Further, in the embodiment as shown in FIGS. 1 to 4, screw insertion portion 2c is a pier which is formed outside the opening portion of pocket 2a and at the same time inside rear case 2. Screw insertion hole 2d is formed on the pier.

Then, screw insertion hole 2d is overlapped with screw insertion hole 4d which is formed in screw fixing portion 4c of clip 4, in order to insert screw 3 into screw tap 1a of front case 1.

Figure 2:
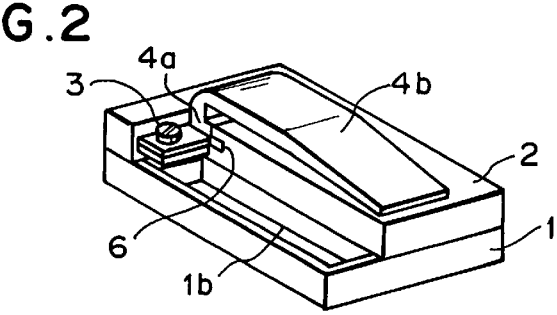
FIG. 2 is a perspective view of a portable remote terminal which includes a clip structure of the present invention.
Figure 3:
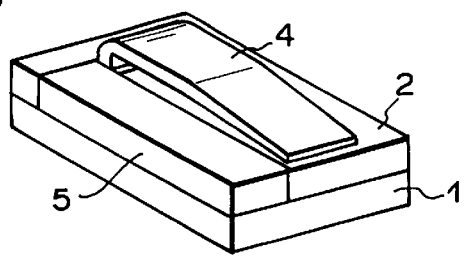
FIG. 3 is an assembled perspective view of a portable remote terminal which includes a clip structure of the present invention and a battery cover.

There is provided cover 5 on rear case 2, as shown in FIG. 3, which covers both the pier (screw insertion portion 2c) and screw fixing portion 4c of clip 4. Cover 5 is put on the top of front case 1, together with rear case 2. Cover 5 is also used for covering battery box 1b. Base portion 4a of clip 4 and pocket 2a is inserted into groove 6 as shown in FIGS. 1 and 2. Further, the screw fixing portion 4c is preferably united with base portion 4a.

To assemble front case 1 with rear case 2, clip 4 is moved horizontally along the arrow as shown in FIG. 1. Then, base portion 4a of clip 4 is inserted into pocket 2a. Further, screw fixing potion 4c is put on the top of the pier (screw insertion portion 2c). Then, rear case 2 is moved vertically along the arrow as shown in FIG. 1, and joined to front case 1.

Screw 3 is screwed into screw tap 1a though screw insertion holes 2d and 4d which are positioned coaxially to fix clip 4 to front case 1 and rear case 2, at the same time. Afterward, cover 5 is moved horizontally to fix the same with front case 1 and rear case 2. Thus, screw insertion portion 2c and battery box 1b are covered by cover 5.

Portable remote terminals such as pocket telephone are brought about by putting a part of jacket or a belt between elastic supporting portion 4b and the outer surface 7 of rear case 2. Therefore, in the present invention, a number of parts and assembling steps are reduced, in comparison with the conventional structure which includes hinge axis or spring.

Particularly, the assembling step for fixing clip 4 is simplified by utilizing screw 3 which tightens up front case 1 to rear case 2. Further, particularly by virtue of a tight groove connection, the easiness of adjustment, fixation, and detachment between a clip and cases is obtained, and the strength of the clip is guaranteed.

Figure 4:
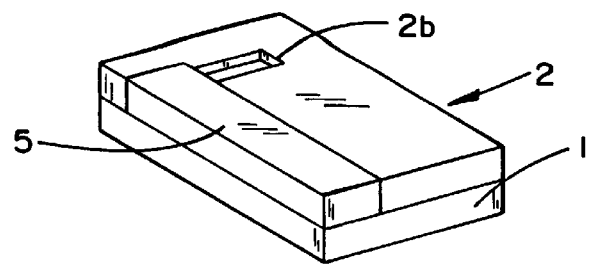
FIG. 4 is an assembled perspective view of a portable remote terminal without a clip.
Figure 5:
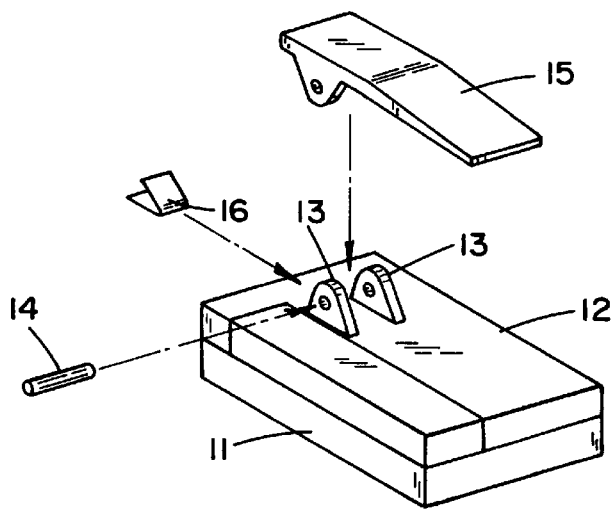
FIG. 5 is a exploded perspective view of a portable remote terminal which includes a conventional clip structure.
Figure 6:
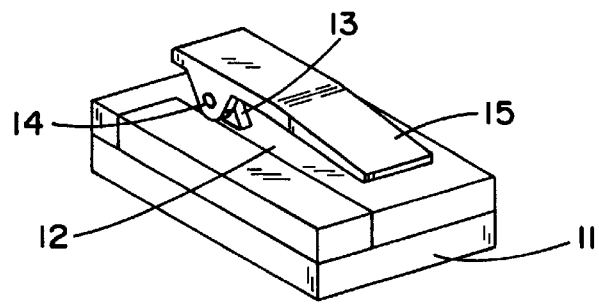
FIG. 6 is an assembled perspective view of a portable remote terminal which includes a conventional clip structure.

The clip may be removed, if desired. In this case, screw 3 is taken off, base portion 4a of clip 4 is detached from pocket 2a, and clip 4 is removed. Then, screw 3 is screwed into screw tap 1a through screw insertion hole 2d to fix rear case 2 on front case 1, as shown in FIG. 4.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A portable communication terminal comprising:

a front and rear case, one of which having a first insertion hole, the other having a screw tap corresponding to the first insertion hole;

a clip having a second insertion hole corresponding to both the first insertion hole and the screw tap; and a screw disposed in the first and second insertion holes and mating with the screw tap for fixing together the front and rear cases and the clip.

2. The portable communication terminal of claim 1, wherein:

one of the front or rear cases having the first insertion hole further having a pocket, the pocket further having a screw insertion portion having the first insertion hole; and the clip having a base portion which fits within the pocket, the base portion further having a screw fixing portion corresponding to the screw insertion portion, the screw fixing portion having the second insertion hole.

3. The portable communication terminal of claim 2, wherein the screw insertion portion is formed outside the pocket.

4. The portable communication terminal of claim 3, further comprising a cover for covering the screw insertion portion, screw fixing portion, and screw.

5. The portable communication terminal of claim 4, wherein the cover and the front or rear case having the tap screw form a battery box for containment of a battery for powering the communication terminal.

6. The portable communication terminal of claim 2, wherein said pocket further has a groove and the base portion further has a corresponding tab mating within the groove.

7. The portable communication terminal of claim 2, wherein the screw fixing portion is integral with the clip.

8. The portable communication terminal of claim 1, wherein the rear case has the first insertion hole and the front case has the screw tap.

* * * * *